(12) United States Patent
Anderson et al.

(10) Patent No.: US 6,785,130 B2
(45) Date of Patent: Aug. 31, 2004

(54) COMPUTING DEVICE AND METHODS AND SYSTEMS FOR SAME

(75) Inventors: Hyrum M Anderson, Houston, TX (US); Ken Takemoto, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/282,347

(22) Filed: Oct. 28, 2002

(65) Prior Publication Data

US 2004/0080900 A1 Apr. 29, 2004

(51) Int. Cl.[7] .................................................. G06F 1/16
(52) U.S. Cl. ........................ 361/683; 361/679; 70/58; 70/278
(58) Field of Search ................................ 361/679–686; 70/58, 67, 77–79, 158–160, 266, 277–278

(56) References Cited

U.S. PATENT DOCUMENTS

| 4,866,962 | A  | * | 9/1989  | Aston et al. | ............... | 70/277  |
| 5,255,154 | A  | * | 10/1993 | Hosoi et al. | ............... | 361/681 |
| 6,307,738 | B1 | * | 10/2001 | Tran et al.  | ............... | 361/683 |
| 6,549,503 | B2 | * | 4/2003  | Matos        | ............... | 369/75.1 |

* cited by examiner

*Primary Examiner*—Yean-Hsi Chang

(57) ABSTRACT

A computing device is described. The computing device can include a base portion and a lid portion connected to the base portion. The lid portion is configured to be deployed from a closed position to an open position. The computing device can also include a locking mechanism for locking the lid portion in the closed position. The computing device can further include multiple user-engagable input mechanisms, at least some of the multiple input mechanisms being accessible when the lid portion is in the closed position and which can be manipulated by a user to unlock the locking mechanism.

19 Claims, 4 Drawing Sheets

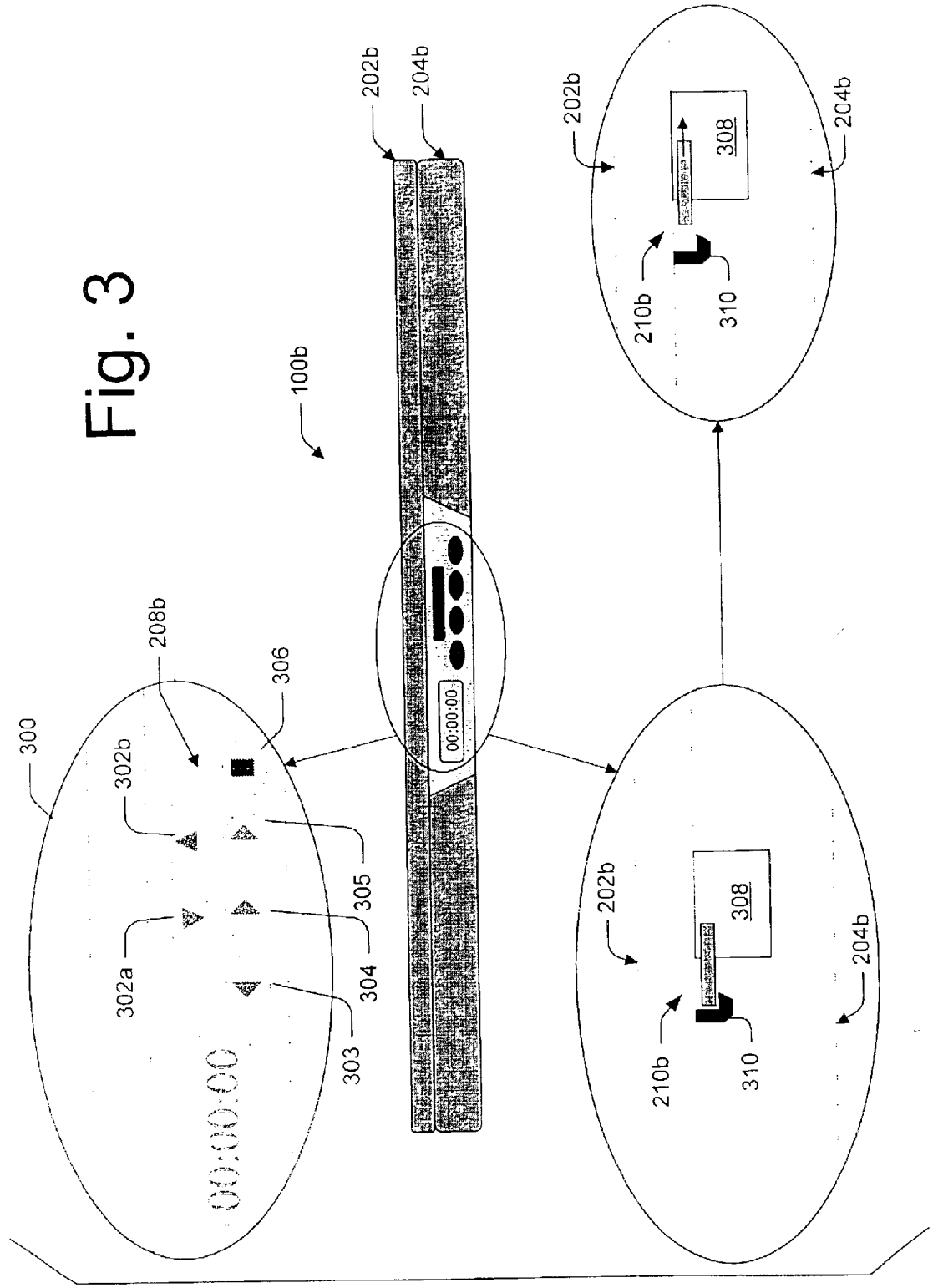

COMPUTING DEVICE AND METHODS AND SYSTEMS FOR SAME

BACKGROUND

With the increased mobility of people in today's society, the demand for mobile computing and communication capabilities has increased dramatically. Individuals desire a computing device that can be easily transported with them for convenience, ease of use, and increased productivity. A portable computing device is often relatively compact, and can be self-contained. The same features that make a computing device easily portable for a user also make the device susceptible to theft. Therefore, it would be beneficial to improve the theft deterrence characteristics of various computing devices, most notably portable computing devices.

Accordingly, the described embodiments provide computing devices having advantageous security or theft deterrence characteristics.

BRIEF DESCRIPTION OF THE DRAWINGS

The same numbers are used throughout the drawings to reference like features and components.

FIG. 3 illustrates a front view of an exemplary computing device in accordance with one embodiment.

DETAILED DESCRIPTION

Overview

Various securable computing devices are described. In one embodiment, the computing device comprises a notebook or laptop computer that has a lid pivotably connected to a base portion. The lid is deployable from a closed position in which the lid can be locked to the base portion, to an opened position in which a keyboard on the base portion can be accessed and used by a user. The computing device has a housing that includes various user-engagable input mechanisms or buttons. When the lid is in the closed position, the input mechanisms can be used as a part of a combination lock assembly to provide a user-keyed combination to unlock a locking mechanism that allows the user to open the lid. When the lid is deployed to the opened position, in some embodiments, these very same input mechanisms or buttons can be used to provide user input that is used by the computing device to implement a particular functionality. Examples of various functionalities are provided below.

Exemplary Embodiments and Methods

Figure 1:
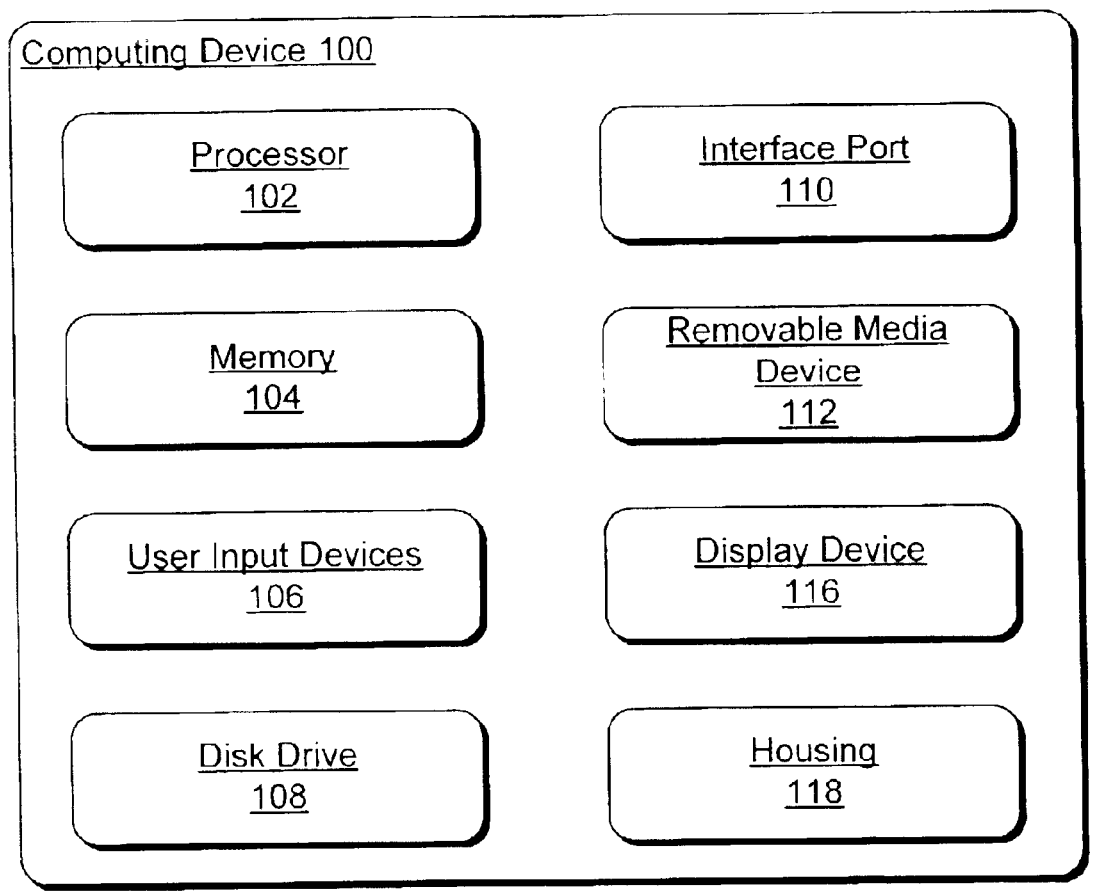
FIG. 1 shows a block diagram of selected functional components of an exemplary computing device in accordance with one embodiment.

For purposes of understanding various structures associated with an exemplary computing device, consider FIG. 1, which is a block diagram showing exemplary components of a computing device 100. The computing device 100 may include a processor 102, a memory 104 (such as ROM and RAM), user-engagable input mechanisms 106, a disk drive 108, interface port 110 for inputting and outputting data, and a removable media device 112. It can further have a display device 116, and a housing 118 for supporting and positioning the various components.

The processor 102 can perform various instructions to control the operation of the computing device 100. Memory 104, disk drive 108, and removable media device 112 can provide data storage devices. The data storage devices can comprise computer-readable media that can have computer readable instructions thereon. The computer-readable instructions when read by the computer can cause the computer to perform a desired functionality.

User-engagable input mechanism(s) 106 can include a keyboard, mouse, pointing device, joystick and/or other mechanism for inputting information to the computing device. Various input mechanisms will be discussed in more detail below. Interface port 110 can provide a mechanism for computing device 100 to communicate with other devices.

A removable media device 112 can include built-in CD-ROM's, DVD-ROM's, floppy disc drives, CD-RW drives, DVD-R/RW drives, DVD+R/RW drives, DVD-RAM drives, SuperDisc drives, Zip drives, and other emerging technologies.

Suitable display devices 116 can have various configurations. Examples include cathode ray tubes (CRT), and liquid crystal displays (LCD), among others. The various components can be positioned relative to one another and/or protected by the housing 118. The housing can be made from various materials such as various plastics, polymers, and metals, among others. The above described components need not all be present in a particular exemplary computing device. Further, some exemplary computing devices can have more than one of a specific component. For example, a particular computing device may have a floppy disk drive and a CD-ROM.

The computing device described herein can be one type of suitable computing device as it relates to the described embodiments, others can include, but are not limited to, personal computers, notebook computers, laptop computers, personal digital assistants (PDAs), video games, portable video games, cell phones, and other computing devices.

Figure 2A:
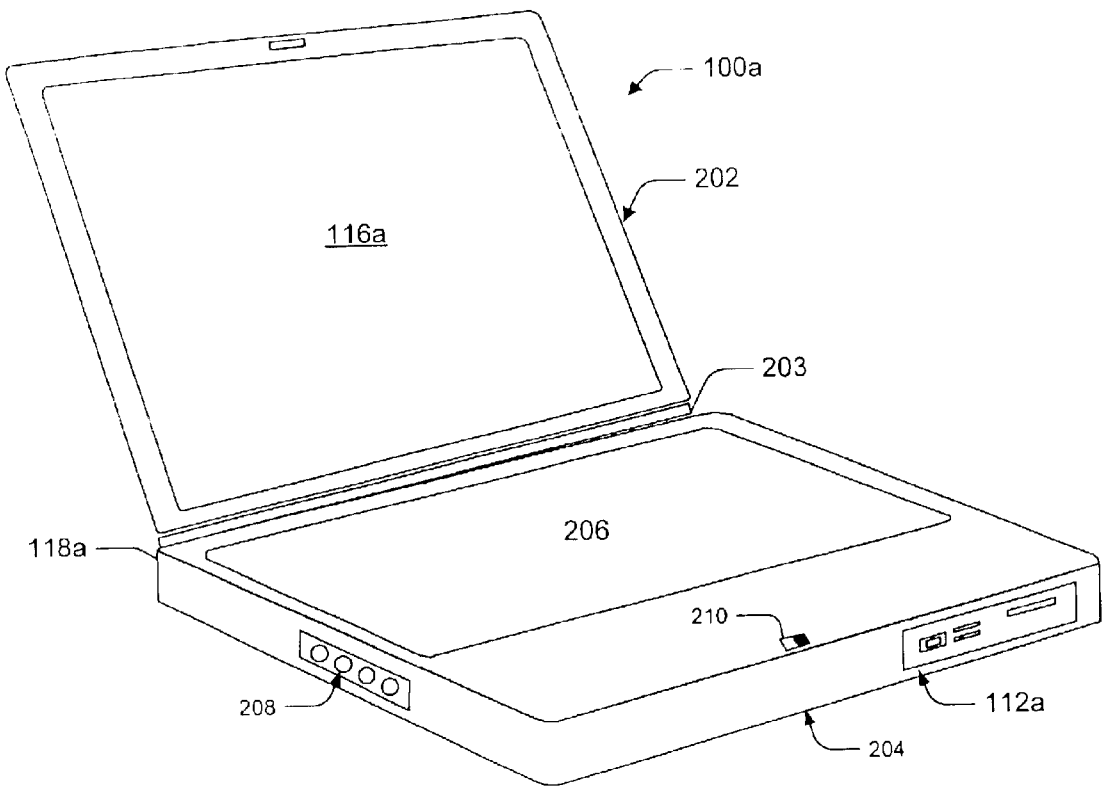
FIGS. 2a–2b illustrate a perspective view of an exemplary computing device in accordance with one embodiment.
Figure 2B:
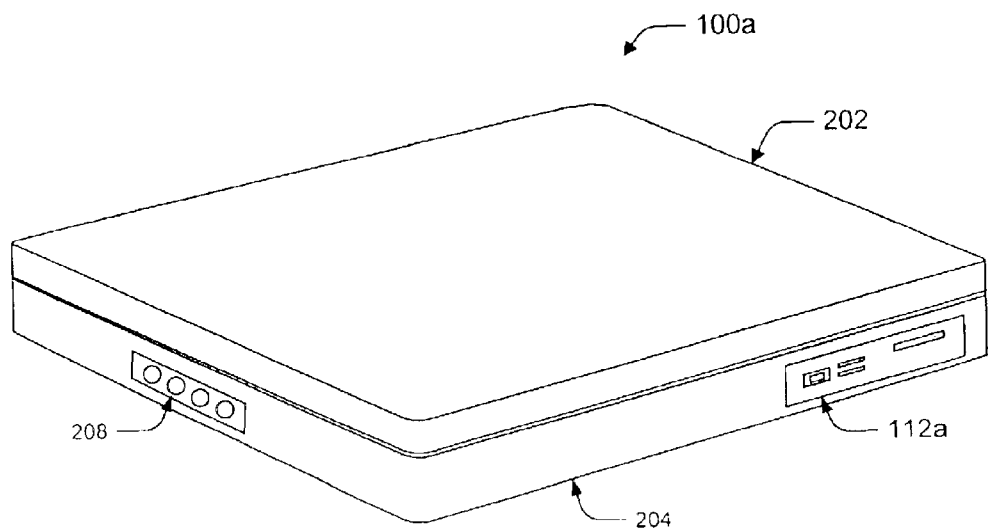

FIGS. 2a–2b show an exemplary computing device in accordance with one embodiment. In this embodiment, the computing device can comprise a notebook computer 100a having a housing 118a. The housing can comprise a lid portion 202 connected via a hinge 203 to a body or base portion 204. Such a configuration allows the lid to move between an open position (as shown in FIG. 2a) and a closed position (as shown in FIG. 2b) where the lid is folded onto the base portion 204. The notebook computer also includes a display 116a mounted in the lid. The display can be seen by a user when the lid is open, and is protected by the housing when the lid is closed.

As shown here, the base portion 204 can contain a data storage device 112a that in this embodiment comprises a floppy disk drive. The notebook computer 100a can also contain various user-engagable input mechanisms which, in this embodiment, comprise a keyboard 206 and input buttons 208, among others. The various input mechanisms allow a user to interact with, and control the function of, the notebook computer. For example, the keyboard allows a user to enter various characters and control various programs contained on the computer. Other input mechanisms can allow a user to control the function of various components comprising the computer. For example, some input mechanisms can allow a user to control a volume setting of the computer.

The exemplary notebook computer 100a can further have a lock or locking mechanism 210 for locking the lid 202 in the closed position. The lock 210 can be controlled by activating the user-engagable input mechanisms in a proper sequence or combination. Suitable examples will be discussed in more detail below.

In this embodiment, some of the input buttons 208 are accessible to a user regardless of the lid position. Other input mechanisms and components such as the keyboard 206 and display 116a are accessible only when the lid 202 is open (as shown in FIG. 2a). When the lid is closed the display cannot be seen and the keyboard can not be used. With this configuration, a user can achieve full functionality with the computer only when the lid is open. Conversely, when the lid is closed the computer has diminished functionality. The input buttons 208 are accessible whether the lid is in the open or closed position. As such, the input buttons can be used as part of a combination lock assembly.

The combination lock assembly can allow a user-keyed combination to unlock the locking mechanism 210. With the locking mechanism unlocked, the user can open the lid 202. Unauthorized users, who do not know the proper sequence of the user-keyed combination, will be unable to open the lid. By locking the computer in the closed position, the computer has diminished functionality to anyone who does not know the proper sequence to unlock the lock. In this state the computer cannot be used to its full or normal capacity. This feature can reduce unauthorized access to the computer. This feature can also greatly diminish the value of the computer to potential thieves and therefore can decrease the likelihood of the computer being targeted for theft.

Though the notebook computer 100a has a high degree of security, the user can simply activate the input buttons 208 in the proper sequence to unlock the lid 202 and regain functionality. In this embodiment, the input buttons 208 are dedicated solely to controlling the lock. Other suitable embodiments will be described below where the input buttons are multi-function.

FIG. 3 shows a front elevational view of another exemplary computing device comprising a notebook computer 100b. The notebook computer has a lid 202b that is closed on a base 204b. Positioned in and supported by the base are multiple input buttons 208b. The input buttons can be more clearly seen in expanded portion 300. In this embodiment, the input buttons 208b comprise multi-function input mechanisms. The input buttons can be engaged or manipulated to control a removable media device that, in this embodiment, comprises a CD player (not shown). In this embodiment, the input buttons comprise volume buttons 302a and 302b, a back button 303, a play button 304, a forward button 305, and a stop button 306. The input buttons can also be engaged to unlock a lock or locking mechanism 210b and allow a user to open the lid 202b. The input buttons 208b and the locking mechanism 210b can in some embodiments comprise a combination lock.

In this embodiment, a pre-established activation sequence can be saved on a data storage device (not shown) of the notebook computer 100b such that a user entered sequence can be compared to the saved sequence. In some embodiments, this pre-established activation sequence can be set by the manufacturer. Other embodiments can allow the user to set the sequence. Still other embodiments can have a factory set sequence that can be reset by the user. Some embodiments, can be designed so that after a certain number of improper sequences are entered the computer blocks all input for a given period of time. Such a configuration can prevent a potential thief from trying to enter all the possible combinations to open the lock. One of skill in the art will recognize other satisfactory embodiments.

In an embodiment such as the one shown in FIG. 3, where the input buttons 208b are multi-function, the pre-established sequence can comprise a first subsequence and a second subsequence. For example, volume buttons 302a and 302b can be pressed simultaneously as the first subsequence to instruct the computer that the following input or second subsequence is directed at controlling the lock. This second subsequence can comprise a unique number of inputs on the various input buttons 208b. For example, the second subsequence can comprise any order of activating some or all of the volume buttons 302a and 302b, the back button 303, the play button 304, the forward button 305, and/or the stop button 306.

If the sequence that is entered equals the pre-established sequence the locking mechanism 210b can be opened. For example, as shown here, a user can press the volume keys (302a and b) simultaneously, and then press the stop key 306, the play key 304, the forward key 305, and the volume up key 302b to open the lock 210b. In this embodiment, the lock can comprise a solenoid 308 that can engage and disengage a fixed structure 310 and allow the lid 202b to be opened. Other suitable locking mechanisms will be recognized by the skilled artisan.

In this embodiment, a thief cannot defeat the lock by disconnecting a power source from the computer. Previous security devices often employed password protection that could be defeated by disconnecting the battery or other power source which caused the electronic passwords to be disabled. Other password protection systems can be defeated by replacing the computer's hard drive or other hardware components. With the described embodiment, disconnecting the battery makes it more difficult to defeat the security device since the solenoid uses energy from the battery to disengage or unlock. Likewise replacing hardware components in the current embodiments may eliminate the instructions to open the lock when a given set of conditions are met (entering the proper sequence).

The described embodiments can physically secure the computer without the need for altering the external configuration of the computer or necessitating attaching it to external objects. Some previous security devices have required a portion of the housing be formed to allow a cable or other fastening device to be attached. The cable could then be fixed to an immobile object to prevent theft. However, the cables are easily cut. Further, making a portable computing device immobile defeats the inherent purpose of the device. The present embodiments maintain the beneficial characteristics of the portable computing device while decreasing the attractiveness to potential thieves.

The embodiments described so far have been in the context of notebook computers, but are equally applicable to other computing devices. For example, many cell phones have a base portion and a lid portion where the lid portion can be closed onto the base portion to cover at least some of the functional components of the cell phone. Many of these cell phones have some input mechanisms that remain accessible when the lid is closed. These input mechanisms can be utilized as described above to control a locking mechanism that prevents the lid from being opened. This feature could reduce the chance of someone stealing the phone and making unauthorized calls.

Similarly, a protective lid or cover, a locking mechanism and/or accessible input buttons can be added to various computing devices to achieve the desired functionality.

Figure 4:
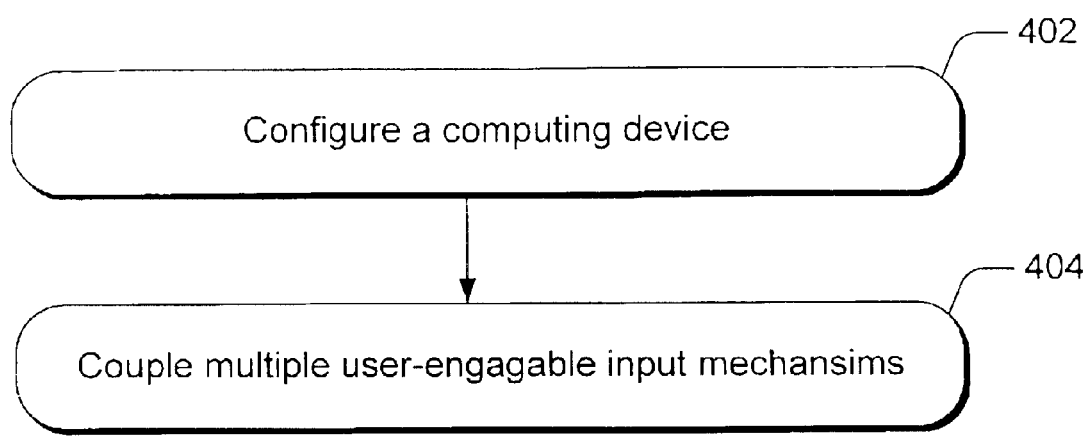
FIG. 4 shows a flow chart representing acts in accordance with one exemplary method.

FIG. 4 shows a flow chart representing an exemplary method in accordance with one embodiment. As shown at

402, the method configures a computing device with a physical locking mechanism capable of locking the computing device in a storage position. This can allow a deployable portion of the computing device to be physically locked to a base portion.

As shown at 404, the method couples multiple user-engagable input mechanisms to the physical locking mechanism to allow a user to unlock the controllable locking mechanism. This can allow multiple input mechanisms to be activated to unlock the deployable portion.

Conclusion

The described embodiments allow a computer user to exercise increased control over a computing device by controlling deployment of a lid portion from a closed position to an open position. Only a user possessing the proper sequence can open the lid by manipulating user-engagable input mechanisms to unlock a locking mechanism. Unauthorized users cannot access the computing device and are less likely to attempt to take possession of the computing device.

Although the invention has been described in language specific to structural features and/or methodological steps, it is to be understood that the invention defined in the appended claims is not necessarily limited to the specific features or acts described. Rather, the specific features and steps are disclosed as preferred forms of implementing the claimed invention.

What is claimed is:

1. A portable computing device comprising:
   a housing comprising a deployable lid and a base;
   the deployable lid configured to deploy between a closed position and an open position;
   a lock on the computing device for locking the lid when the lid is in the closed position;
   one or more components supported by the housing; and,
   at least one multi-function, user-engagable input mechanism on the housing and configured to be engaged by a user for unlocking the lid, said input mechanism also serving as an input mechanism for one or more of the components supported by the housing.

2. A portable computing device as recited in claim 1, wherein the lid comprises a display device.

3. A portable computing device as recited in claim 1, wherein the at least one multi-function, user-engagable input mechanism comprises a plurality of multi-function, user-engagable input mechanisms.

4. A portable computing device as recited in claim 3, wherein the plurality of multi-function, user-engagable input mechanisms are configured to allow the user to unlock the lid by manipulating the input mechanisms in a pre-established sequence.

5. A portable computing device as recited in claim 4, wherein the pre-established sequence comprises a first subsequence.

6. A portable computing device as recited in claim 5, wherein the first subsequence notifies the portable computing device that the pre-established sequence is directed at unlocking the lock.

7. A portable computing device as recited in claim 5, wherein the pre-established sequence comprises a second subsequence.

8. A portable computing device as recited in claim 7, wherein the second subsequence unlocks the lock.

9. A portable computing device as recited in claim 1, wherein the lock comprises a solenoid.

10. A portable computing device as recited in claim 1, wherein one of the components for which said user-engagable input mechanism serves as an input mechanism comprises a CD player.

11. A portable computing device as recited in claim 1, wherein the computing device comprises a notebook computer.

12. A portable computing device as recited in claim 1, wherein the computing device comprises a cell phone.

13. A portable computing device as recited in claim 1, wherein the computing device comprises a personal digital assistant (PDA).

14. A portable computing device comprising:
    a housing comprising a lid and a base;
    the lid configured to deploy between a closed position and an open position;
    a lock on the computing device for locking the lid when the lid is in the closed position;
    a removable media device supported by the housing; and,
    a plurality of multi-function, user-engagable input mechanisms on the housing and configured to be engaged by a user for unlocking the lid, said input mechanisms also serving as input mechanisms for the removable media device.

15. A portable computing device as recited in claim 14, wherein the removable media device comprises a CD-ROM.

16. A portable computing device as recited in claim 14, wherein the lock is located on the lid.

17. A portable computing device as recited in claim 14, wherein the lock is located on the base.

18. A locking device for use on a computing device comprising:
    a lock configured for use with a computing device having a lid, the lock capable of locking the lid in a closed position; and,
    multiple multi-function user-engagable input mechanisms for use with the computing device and configured to be engaged by a user for a unlocking the lid, wherein the multi-function user-engagable input mechanisms are configurable to allow a user to control a function of a removable media device comprising the computing device.

19. A looking device as recited in claim 18, wherein the removable media device comprises a DVD-RAM device.

* * * * *